United States Patent
Milne et al.

(10) Patent No.: US 9,426,610 B2
(45) Date of Patent: Aug. 23, 2016

(54) APPLYING MESH NETWORK TO LUGGAGE

(71) Applicant: Sony Corporation, Tokyo (JP)

(72) Inventors: James R. Milne, Ramona, CA (US); Gregory Peter Carlsson, Santee, CA (US); Frederick J. Zustak, Poway, CA (US)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 14/332,919

(22) Filed: Jul. 16, 2014

(65) Prior Publication Data

US 2016/0021491 A1    Jan. 21, 2016

(51) Int. Cl.
| | |
|---|---|
| *G08B 21/00* | (2006.01) |
| *H04W 4/02* | (2009.01) |
| *G08B 21/18* | (2006.01) |
| *G08B 13/14* | (2006.01) |
| *G08B 21/24* | (2006.01) |
| *H04W 84/18* | (2009.01) |

(52) U.S. Cl.
CPC ............... *H04W 4/02* (2013.01); *G08B 13/14* (2013.01); *G08B 21/182* (2013.01); *G08B 21/24* (2013.01); *H04W 84/18* (2013.01)

(58) Field of Classification Search
CPC ...... H04W 4/02; H04W 84/18; G08B 21/182; G08B 1/08; G08B 13/14; G08B 21/0277; G08B 21/0233; G08B 21/24; G08B 21/0291; G08B 21/0247; G08B 21/18; H04L 43/10; G06F 3/167; G06F 3/0482; H04M 1/7253
USPC ........ 340/572.1–572.8, 573.1, 573.4, 539.11, 340/539.13, 539.22, 665, 8.1
See application file for complete search history.

(56) References Cited

U.S. PATENT DOCUMENTS

| | | | |
|---|---|---|---|
| 3,985,357 | A | 10/1976 | Miller |
| 4,123,511 | A | 10/1978 | Heintze |
| 4,301,207 | A | 11/1981 | Schomerus |
| 4,340,053 | A | 7/1982 | Sarui |
| 4,463,949 | A | 8/1984 | McCoy, Sr. et al. |
| 4,625,336 | A | 12/1986 | Derderian |
| 4,962,935 | A | 10/1990 | Williams |
| 4,992,003 | A | 2/1991 | Perach |
| 5,154,266 | A | 10/1992 | Bieber et al. |

(Continued)

FOREIGN PATENT DOCUMENTS

| | | |
|---|---|---|
| CN | 101783931 A | 7/2010 |
| JP | 2004233269 | 8/2004 |

(Continued)

OTHER PUBLICATIONS

Arzoo Dahiya, Dr. R.K. Chauhan, "A Comparative Study of MANET and VANET Environment" Journal of Computing, vol. 2, Issue 7, Jul. 2010, ISSN 2151-9617. http://sites.google.com/site/JournalofComputing/.

(Continued)

*Primary Examiner* — Anh V La
(74) *Attorney, Agent, or Firm* — John L. Rogitz

(57) ABSTRACT

Mesh node modules are associated with pieces of luggage, or packages, etc. and companion luggage or packages can dynamically form a mesh network which uploads location information of the nodes and in some cases additional information, e.g., shock signals, to a network. The information may be downloaded to an owner's CE device.

13 Claims, 3 Drawing Sheets

(56) References Cited

U.S. PATENT DOCUMENTS

| | | | |
|---|---|---|---|
| 5,201,075 | A | 4/1993 | Svetich |
| 5,219,316 | A | 6/1993 | Huffman |
| 5,413,328 | A | 5/1995 | Glancey et al. |
| 5,639,243 | A | 6/1997 | Ryan et al. |
| 5,755,405 | A | 5/1998 | Socha et al. |
| 5,927,233 | A | 7/1999 | Mainini et al. |
| 6,401,250 | B1 | 6/2002 | McNabb |
| 6,438,755 | B1 | 8/2002 | MacDonald et al. |
| 6,588,840 | B1 | 7/2003 | Lombardo |
| 6,742,636 | B2 | 6/2004 | Godshaw |
| 6,810,831 | B1 | 11/2004 | Opfel |
| 6,910,447 | B1 | 6/2005 | Azarian |
| 7,323,981 | B2 | 1/2008 | Peel et al. |
| 7,328,671 | B2 | 2/2008 | Kates |
| 7,416,123 | B2 | 8/2008 | Saperstein et al. |
| 7,438,356 | B2 | 10/2008 | Howman et al. |
| 7,451,927 | B2 | 11/2008 | Saperstein et al. |
| 7,626,966 | B1 | 12/2009 | Ruiter et al. |
| 7,714,708 | B2 * | 5/2010 | Brackmann ............... B60P 3/14 180/290 |
| 7,753,826 | B1 | 7/2010 | Oliver et al. |
| 7,770,539 | B1 | 8/2010 | Zimmerman et al. |
| 7,818,820 | B2 | 10/2010 | Tsujimoto |
| 7,916,025 | B2 * | 3/2011 | Locker ............... G08B 13/1427 340/539.11 |
| 8,149,748 | B2 | 4/2012 | Bata et al. |
| 8,253,557 | B2 * | 8/2012 | Ani ........................ G06Q 10/08 340/539.1 |
| 8,366,570 | B1 | 2/2013 | DeMarco et al. |
| 8,568,191 | B2 | 10/2013 | Rehkemper et al. |
| 8,609,454 | B2 | 12/2013 | Dai et al. |
| 8,624,743 | B2 | 1/2014 | Langer et al. |
| 8,878,671 | B2 * | 11/2014 | Buchheim ............. H04W 4/023 340/539.13 |
| 2004/0125493 | A1 * | 7/2004 | Shimotono .......... G11B 5/5582 360/75 |
| 2004/0141635 | A1 | 7/2004 | Liang et al. |
| 2004/0167367 | A1 | 8/2004 | Beierle |
| 2005/0034083 | A1 | 2/2005 | Jaeger |
| 2005/0259033 | A1 | 11/2005 | Levine |
| 2005/0284405 | A1 | 12/2005 | Pomakoy-Poole et al. |
| 2006/0063540 | A1 | 3/2006 | Beuck |
| 2006/0080072 | A1 | 4/2006 | Lachman et al. |
| 2006/0154642 | A1 | 7/2006 | Scannell, Jr. |
| 2006/0224300 | A1 | 10/2006 | Shioya et al. |
| 2006/0242901 | A1 | 11/2006 | Casimaty et al. |
| 2007/0130893 | A1 | 6/2007 | Davies |
| 2007/0138272 | A1 | 6/2007 | Saperstein et al. |
| 2007/0138273 | A1 | 6/2007 | Saperstein et al. |
| 2007/0152479 | A1 | 7/2007 | Howman et al. |
| 2007/0243296 | A1 | 10/2007 | Bourassa et al. |
| 2008/0036610 | A1 | 2/2008 | Hokuf et al. |
| 2008/0120768 | A1 | 5/2008 | Tsujimoto |
| 2008/0173257 | A1 | 7/2008 | Steiner et al. |
| 2008/0229704 | A1 | 9/2008 | Augustyniak et al. |
| 2009/0040048 | A1 | 2/2009 | Locker et al. |
| 2009/0118869 | A1 | 5/2009 | Cauchy et al. |
| 2009/0203367 | A1 | 8/2009 | Pamminger et al. |
| 2010/0020169 | A1 | 1/2010 | Jang et al. |
| 2010/0119755 | A1 | 5/2010 | Chung et al. |
| 2010/0123778 | A1 | 5/2010 | Hada |
| 2010/0152545 | A1 | 6/2010 | Ramsay et al. |
| 2010/0295687 | A1 | 11/2010 | Kuzniar et al. |
| 2011/0005466 | A1 | 1/2011 | Furth |
| 2012/0069051 | A1 | 3/2012 | Hagbi et al. |
| 2012/0099800 | A1 | 4/2012 | Llano et al. |
| 2013/0056929 | A1 | 3/2013 | Rehkemper et al. |
| 2013/0068942 | A1 | 3/2013 | Verenchikov |
| 2013/0093220 | A1 | 4/2013 | Pajic |
| 2013/0132434 | A1 | 5/2013 | Scofield et al. |
| 2013/0141251 | A1 | 6/2013 | Sims et al. |
| 2013/0292976 | A1 | 11/2013 | Kane |
| 2014/0023060 | A1 | 1/2014 | Apte et al. |
| 2014/0025805 | A1 | 1/2014 | Apte et al. |
| 2014/0104046 | A1 | 4/2014 | Howell |
| 2014/0118635 | A1 | 5/2014 | Yang |
| 2014/0173439 | A1 * | 6/2014 | Gutierrez ............... G08B 21/24 715/727 |
| 2014/0179463 | A1 | 6/2014 | Giles et al. |
| 2015/0348413 | A1 | 12/2015 | Han et al. |
| 2016/0019515 | A1 | 1/2016 | Milne et al. |
| 2016/0019788 | A1 | 1/2016 | Milne et al. |
| 2016/0021491 | A1 | 1/2016 | Milne et al. |
| 2016/0021492 | A1 | 1/2016 | Carlsson et al. |
| 2016/0021493 | A1 | 1/2016 | Milne et al. |
| 2016/0021510 | A1 | 1/2016 | Milne et al. |

FOREIGN PATENT DOCUMENTS

| | | |
|---|---|---|
| JP | 2005017465 | 1/2005 |
| JP | 2006279859 | 10/2006 |
| JP | 2013168883 | 8/2013 |

OTHER PUBLICATIONS

Yousaf Saeed, Suleman Aziz Lodhi, Khalil Ahmed, "Obstacle Management in VANET using Game Theory and Fuzzy Logic Control", ACEEE Int. J. on Communications, vol. 4, No. 1, Jul. 2013.

The Seventh ACM International Workshop on Vehicular Inter-NETworking (VANET 2010) in conjunction with ACM MobiCom 2010. Sep. 24, 2010.

Tao Zhang, Xian Chen, Russell Hsing, K. Dnaiel Wong,"VNTA sub-TC" IEEE Communications Society, printed from web Jun. 3, 2014, http://www.danielwireless.com/vnta/.

Reza Azimi, Gaurav Bhatia, Ragunathan (Raj) Rajkumar, Priyantha Mudalige, "Vehicular Networks for Collision Avoidance at Intersections" Society for Automotive Engineers (SAE) World Congress, Apr. 2011, Detroit, MI, USA.

Timo Kosch, Christian Adler, Stephan Eichler, Christopher Schroth, Markus Strassberger, "The Scalability problem of vehicular ad hoc networks and how to solve it", IEEE Wireless Communications Magazine 13, Oct. 2006, No. 5, S.6. http://www.alexandria.unisg.ch/Publikationen/30977.

Danda B. Rawat, Dimitrie C. Popescu, Gongjun Yan, Stephan Olariu, "Enhancing VANET Performance by joint Adaptation of Transmission Power and Contention Window Size", IEEE Transaction on Parallel and Distributed Systems, vol. 22, No. 9, pp. 1528-1535, Sep. 2011.

Stephan Eichler, Benedikt Ostermaier, Christopher Schroth, Timo Kosch, "Simulation of Car-to-Car Messaging: Analyzing the Impact on the Road Traffic", IEEE Computer Society, 2005; 13th Annual Meeting of the IEEE International Symposium on Modeling, Analysis, and Simulation of Computer and Telecommunications Systems (MASCOTS).

J. Gonzalvez, M. Sepulcre, R. Bauza, "IEEE 802.11p Vehicle to Infrastructure Communications in Urban Environments" IEEE Communications Magazine, vol. 50, No. 5, pp. 176-183, May 2012.

Charles McCoy, James R. Milne, True Xiong, "Portable Device to Portable Drive Wireless Power Transfer Methods and Systems" file history of related pending U.S. Appl. No. 14/290,409, filed May 29, 2014.

James R. Milne, Charles McCoy, True Xiong, "Scalable Antenna System" file history of related pending U.S. Appl. No. 14/290,426, filed May 29, 2014.

Charles McCoy, James R. Milne, True Xiong, "Method and System for Use in Configuring Multiple Near Field Antenna Systems" file history of related pending U.S. Appl. No. 14/460,224, filed Aug. 14, 2014.

James R. Milne, Gregory Peter Carlsson, Frederick J. Zustak, "Applying Mesh Network to Pet Carriers", related U.S. Appl. No. 14/333,066, Applicant's response to Final Office Action filed Oct. 28, 2015.

James R. Milne, Gregory Peter Carlsson, Frederick J. Zustak, "Applying Mesh Network to Pet Carriers", related U.S. Appl. No. 14/333,006. Final Office Action dated Oct. 28, 2015.

James R. Milne, Gregory Peter Carlsson, Frederick J. Zustak, "Applying Mesh Network to Luggage", related U.S. Appl. No. 14/333,006, Non-Final Office Action dated Aug. 27, 2015.

(56) References Cited

OTHER PUBLICATIONS

James R. Milne, Gregory Peter Carlsson, Frederick J. Zustak, "Applying Mesh Network to Luggage", related U.S. Appl. No. 14/333,006, Applicant's response to Non-Final Office Action filed Aug. 31, 2015.

James R. Milne, Gregory Peter Carlsson, Frederick J. Zustak, "Applying Mesh Network to Pet Carrier", applicants response to final office action filed Oct. 28, 2015 in related pending U.S. Appl. No. 14/333,006.

James R. Milne, Gregory Peter Carlsson, Frederick J. Zustak, "Applying Mesh Network to Pet Carrier", non-final office action dated Dec. 4, 2015 in related pending U.S. Appl. No. 14/333,006.

James R. Milne, Gregory Peter Carlsson, Frederick J. Zustak, "Applying Mesh Network to Pet Carrier", applicants response to non-final office action filed Dec. 10, 2015 in related pending U.S. Appl. No. 14/333,006.

Shiro Sakata, "Technical Paper, Chapter 2 Ad-Hoc Network, fifth title mobile IP Ad-Hoc Network, fourth group mobile/wirelss, knowledge base, knowledge forest" Institute of Electronics, Information and Communication Engineers, Jun. 10, 2010 URL link http://www.ieice-hbkb.org/files/04/04gun_05hen_02.pdf.

James R. Milne, Gregory Peter Calrsson, Frederick J. Zustak, "Vehicle Ad Hoc Network (VANET)", related U.S. Appl. No. 14/332,900, Non-Final Office Action dated Jan. 14, 2016.

James R. Milne, Gregory Peter Calrsson, Frederick J. Zustak, "Vehicle Ad Hoc Network (VANET)", related U.S. Appl. No. 14/332,900, Applicant's response to Non-Final Office Action filed Jan. 15, 2016.

James R. Milne, Gregory Peter Carlsson, Frederick J. Zustak, "Applying Mesh Network to Pet Carrier", related U.S. Appl. No. 14/333,006, filed Jul. 16, 2014.

James R. Milne, Gregory Peter Carlsson, Frederick J. Zustak, "Applying Mesh Network to Stadium Services", related U.S. Appl. No. 14/332,849, filed Jul. 16, 2014.

James R. Milne, Gregory Peter Carlsson, Frederick J. Zustak, "Vehicle AD Hoc Network (VANET)" related pending U.S. Appl. No. 14/332,900, filed Jul. 16, 2014.

James R. Milne, Gregory Peter Carlsson, Frederick J. Zustak, "Mesh Network Applied to Fixed Establishment with Movable Items Therein", related pending U.S. Appl. No. 14/332,836, filed Jul. 16, 2014.

Gregory Peter Carlsson, Frederick J. Zustak, James R. Milne,"Mesh Network Applied to Arena Events", related pending U.S. Appl. No. 14/332,953, filed Jul. 16, 2014.

James R. Milne, Gregory Peter Carlsson, Frederick J. Zustak, "Applying Mesh Network to Pet Carriers", related U.S. Appl. No. 14/333,006. Final Office Action dated Feb. 22, 2016.

James R. Milne, Gregory Peter Carlsson, Frederick J. Zustak, "Applying Mesh Network to Pet Carriers", related U.S. Appl. No. 14/333,006, Applicant's response to Final Office Action filed Mar. 16, 2016.

James R. Milne, Gregory Peter Carlsson, Frederick J. Zustak, "Vehicle Ad Hoc Network (VANET)", related pending U.S. Appl. No. 15/149,562, filed May 9, 2016.

\* cited by examiner

APPLYING MESH NETWORK TO LUGGAGE

FIELD OF THE INVENTION

The application relates generally to applying mesh networks to luggage.

BACKGROUND OF THE INVENTION

A mesh network is a type of computer ecosystem characterized by its sustainability, self-organization, and scalability. Each mesh node relays network data flowing to the node, and the nodes cooperate to appropriately distribute the data in the network. Typically, mesh networks are relatively short range networks, i.e., with node-to-node link distances of 250 meters or less, although a mesh network may use a gateway to connect to a wide area network such as the Internet.

Because mesh networks typically are wireless, they are ad hoc, meaning that nodes easily join and leave the network. As but one example, mesh networks can be spontaneously organized by the wireless computing devices establishing the nodes using Zigbee. Other example non-limiting mesh network protocols/systems can be based on Wi-Fi IEEE 802.11p, IEEE 802.11s, WAVE IEEE 1609, WiMAX IEEE 802.16, Bluetooth, and IRA.

When the wireless nodes of a mesh network move as the network operates, the network is sometimes referred to as a mobile ad hoc network (MANET) which continuously self-configures as nodes move into network range and out of network range. For this reason, nodal links in MANETs change frequently. MANETs may operate independently but may also use one or more of the nodes as a gateway to other MANETs and other networks such as the Internet.

Of relevance to this application is the application of mesh/MANET principles to track luggage.

SUMMARY OF THE INVENTION

As understood herein, in the case of luggage, travelers who check luggage do not know the status of their luggage during transport; bags arrive at the destination or they don't. In the case of packages, the solution to this issue is providing updates via a tracking number and posting data to a website. However, the real time, minute by minute location is not tracked, nor, apart from visual inspection of the luggage or packages after arrival, does the recipient or owner know whether the items were roughly handled.

Present principles add sensors to nodal modules associated with personal luggage, so that the owner of the luggage can track in real-time various parameters such as location relative to owner (or relative to other bags in a group), the type of handling (i.e., g-forces), as well as passing through security check points. In an example, the owner can undertake such monitoring using an application on a smart computer device such as a smart phone.

Accordingly, an apparatus includes a luggage body defining an enclosure openable to load and unload clothing into the enclosure and closable to maintain clothing securely within the enclosure. A handle is attached to the luggage body to facilitate gripping by a human hand. A location sensor is engaged with the luggage body and a wireless transmitter is supported by the luggage body. Further, a computer readable storage medium bears instructions executable by a processor, and a processor is supported by the luggage body and is configured to receive signals from the location sensor. The processor is also configured for accessing the computer readable storage medium to execute the instructions to configure the processor to upload to a network, via the wireless transmitter, location signals according to signals received from the location sensor.

In some examples, a shock sensor is supported by the luggage body and is configured to send signals to the processor. The instructions when executed by the processor configure the processor to upload signals to the network via the transmitter representing shock to the luggage body as indicated by the signals from the shock sensor. Without limitation, the shock sensor may include an accelerometer or a gyroscope.

If desired, the instructions when executed by the processor may configure the processor to determine, using information from the transmitter, whether communication with the network through at least one network access point is available. Responsive to a determination that communication with the network through at least one network access point is available, the processor automatically sends at least one of the location signals to the network. The instructions when executed by the processor may further configure the processor to, responsive to a determination that communication with the network through at least one network access point is available, automatically send a sequence of locations signals to the network. Still further, the instructions when executed by the processor can configure the processor to determine whether a signal from the shock signal indicates a shock satisfying a threshold, and responsive to a determination that at least one signal from the shock signal indicates a shock satisfying a threshold, upload at least one signal to the network via the transmitter representing shock to the luggage body. However, responsive to a determination that no signal from the shock signal indicates a shock satisfying a threshold, the processor does not upload a signal to the network via the transmitter representing shock to the luggage body.

In another aspect, a consumer electronics (CE) device includes a display, a wireless transceiver, and a computer readable storage medium bearing instructions executable by a processor. A processor is configured for accessing the computer readable storage medium to execute the instructions to configure the processor to receive location information through the transceiver from at least one luggage or package, and to present the location information on the display.

In this aspect, the instructions when executed by the processor may configure the processor to present on the display a first message indicating a current location of the luggage or package by indicating the generic term for the current location. The instructions when executed by the processor can configure the processor to present on the display a second message indicating a past location of the luggage or package. Moreover, in some examples, the instructions when executed by the processor configure the processor to receive shock information through the transceiver from the luggage or package, and present on the display a message derived from the shock information. The message derived from the shock information may be presented only responsive to a determination that the shock information indicates a shock satisfying a threshold. Also, the processor can if desired present on the display a map indicating a boundary of a building in which the CE device is located, and indicating a location of the CE device within the building. The map also may indicate a currently reported location of the luggage.

In another aspect, a mesh network includes plural computerized node modules associated with respective pieces of luggage and dynamically forming a mesh network which uploads location information of the node modules to a receiving network for downloading of the location information to a consumer electronics (CE) device.

The details of the present invention, both as to its structure and operation, can be best understood in reference to the accompanying drawings, in which like reference numerals refer to like parts, and in which:

DETAILED DESCRIPTION

Figure 1:
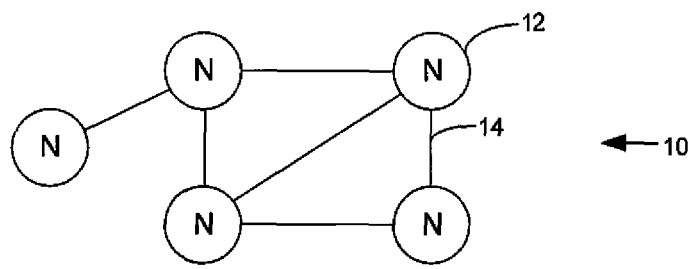
FIG. 1 is a block diagram of an example system including an example in accordance with present principles.

This disclosure relates generally to computer ecosystems and in particular to mesh networks and MANETs. A system herein may include server and client components that establish mesh network nodes, connected over a network such that data may be exchanged between the client and server components, although mesh networks may not include servers. The nodes may include one or more computing devices including portable televisions (e.g. smart TVs, Internet-enabled TVs), portable computers such as laptops and tablet computers, and other mobile devices including smart phones, mesh node modules that can be attached to moving objects, and additional examples discussed below. These devices may operate with a variety of operating environments. For example, some of the devices may employ, as examples, operating systems from Microsoft, or a Unix operating system, or operating systems produced by Apple Computer or Google.

Nodes, however implemented, may include one or more processors executing instructions that configure the node to receive and transmit data over a mesh network such as a MANET. A device such as a server may be instantiated by a game console such as a Sony Playstation (trademarked), a personal computer, etc.

Information may be exchanged over a network between network nodes. To this end and for security, nodes can include firewalls, load balancers, temporary storages, and proxies, and other network infrastructure for reliability and security. One or more nodes may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example mesh network 10 is shown, which may include one or more of the example devices mentioned above and described further below in accordance with present principles. These devices establish respective nodes 12 of the mesh network 10. The nodes 12 can spontaneously join and leave the network 10 as mentioned above, and when a node is a member of the network 10, it communicates with at least some of the other nodes 12 via wireless links 14. The nodes 12 may all be connected to every other node, or more typically are connected only to one or more of the other nodes, forwarding data through the network using "hop" principles and other relevant mesh protocol principles.

The nodes 12 may all be mobile nodes and may communicate only within the network 10, and not outside the network 10. More typically, at least one of the nodes 12 is a router or other gateway device that interfaces the mesh network 10 with other networks, such as the Internet. In some embodiments, one or more of the nodes 12 may be a fixed node, e.g., a gateway router or a server whose location does not change after installation or changes only infrequently, with the remaining node(s) 12 being mobile, while in some embodiments all of the nodes 12 may be fixed nodes.

In any case, the node 12 dynamically establish a mesh network, typically through one or more of the short-range transmitters described below. Each node typically is associated with a unique identification such as a media access control (MAC) address, and the MAC address may be correlated within the node (e.g., at time of manufacture or by a user at time of association with a particular component) or within a network server receiving information from the node with an identification of the component with which the MAC address is associated. For example, a nodal module may be associated with a vehicle, a person, an animal, a bicycle, a piece of luggage or a pet kennel, a particular stadium seat, an item in a factory or store, a user's CE device, etc., and the MAC address of that node may be correlated with the component accordingly. Consequently, when a mesh network is established and at least one of the network nodes uploads information gathered from the other nodes, that information may include (or be correlated at a server to) a type of component, so that a network map or other network information user interface (UI) may be presented showing the mesh nodes along with an identification of the components, and not just the MAC addresses, with which the nodes are associated.

Figure 2:
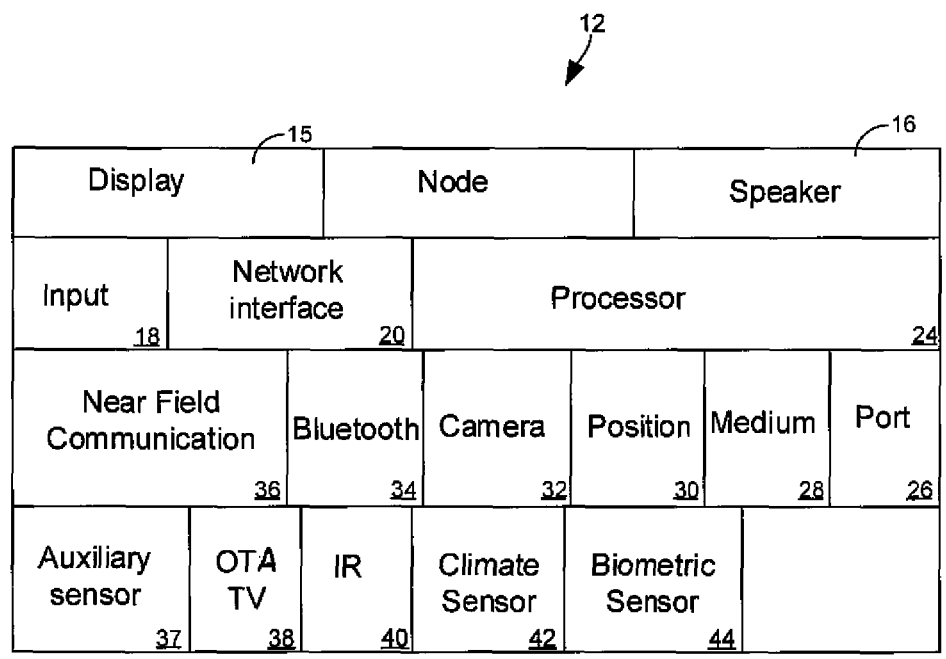
FIG. 2 is a schematic diagram of an example node.

FIG. 2 shows that an example node 12 can (but not must) include one or more displays 15 that may be implemented by a high definition or ultra-high definition "4K" or higher flat screen and that may be touch-enabled for receiving user input signals via touches on the display. The node 12 may include one or more speakers 16 for outputting audio in accordance with present principles, and at least one additional input device 18 such as e.g. an audio receiver/microphone for e.g. entering audible commands to the node 12 to control the node 12. The example node 12 may also include one or more network interfaces 20 for communication over at least one network under control of one or more processors 24. Thus, the interface 20 may be, without limitation, a Wi-Fi transceiver, which is an example of a wireless computer network interface. It is to be understood that the processor 24 controls the node 12 to undertake present principles, including the other elements of the node 12 described herein such as e.g. controlling the display 15 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the node 12 may also include one or more input ports 26 such as, e.g., a high definition multimedia interface (HDMI) port or a USB port to physically connect (e.g. using a wired connection) to another CE device and/or a headphone port to connect headphones to the node 12 for presentation of audio from the node 12 to a user through the headphones. For example, the input port 26 may be connected via wire or wirelessly to a cable or satellite source of audio video content. Thus, the source may be, e.g., a set top box, or a satellite receiver, or a game console or disk player.

The node 12 may further include one or more tangible computer readable storage medium 28 such as disk-based or solid state storage. Also in some embodiments, the node 12 can include one or more position or location receivers such as but not limited to a cellphone receiver, GPS receiver and/or altimeter 30 that is configured to e.g. receive geographic position information from at least one satellite or cellphone tower and provide the information to the processor 24 and/or determine an altitude at which the node 12 is disposed in conjunction with the processor 24. However, it is to be understood that another suitable position receiver other than a cellphone receiver, GPS receiver and/or altimeter may be used in accordance with present principles to e.g. determine the location of the node 12 in e.g. all three dimensions.

Continuing the description of the node 12, in some embodiments the node 12 may include one or more cameras 32 that may be, e.g., a thermal imaging camera, a digital camera such as a webcam, and/or a camera integrated into the node 12 and controllable by the processor 24 to gather pictures/images and/or video in accordance with present principles. Also included on the node 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the node 12 may include one or more auxiliary sensors 37 (e.g., a motion sensor such as an accelerometer, gyroscope, cyclometer, or a magnetic sensor, an infrared (IR) sensor, an optical sensor, a radiation sensor to sense, e.g., x-rays or other wavelengths of radiation, a speed and/or cadence sensor, a gesture sensor (e.g. for sensing gesture command), etc.) providing input to the processor 24. The node 12 may include an over-the-air TV broadcast port 38 for receiving OTA TV broadcasts providing input to the processor 24. In addition to the foregoing, it is noted that the node 12 may also include an infrared (IR) transmitter and/or IR receiver and/or IR transceiver 40 such as an IR data association (IRDA) device. A battery (not shown) may be provided for powering the node 12.

The node 12 may include still other sensors such as e.g. one or more climate sensors 42 (e.g. barometers, humidity sensors, wind sensors, light sensors, temperature sensors, etc.) and/or one or more biometric sensors 44 providing input to the processor 24. For instance, the biometric sensor(s) may include heart rate sensors, temperature sensors, blood pressure sensors, blood sugar sensors, perspiration sensors, etc.

The above methods may be implemented as software instructions executed by a processor, suitably configured ASIC or FPGA modules, or any other convenient manner as would be appreciated by those skilled in those art. Where employed, the software instructions may be embodied in a non-transitory device such as a CD Rom or Flash drive. The software code instructions may alternatively be embodied via a download over the internet.

Figure 3:
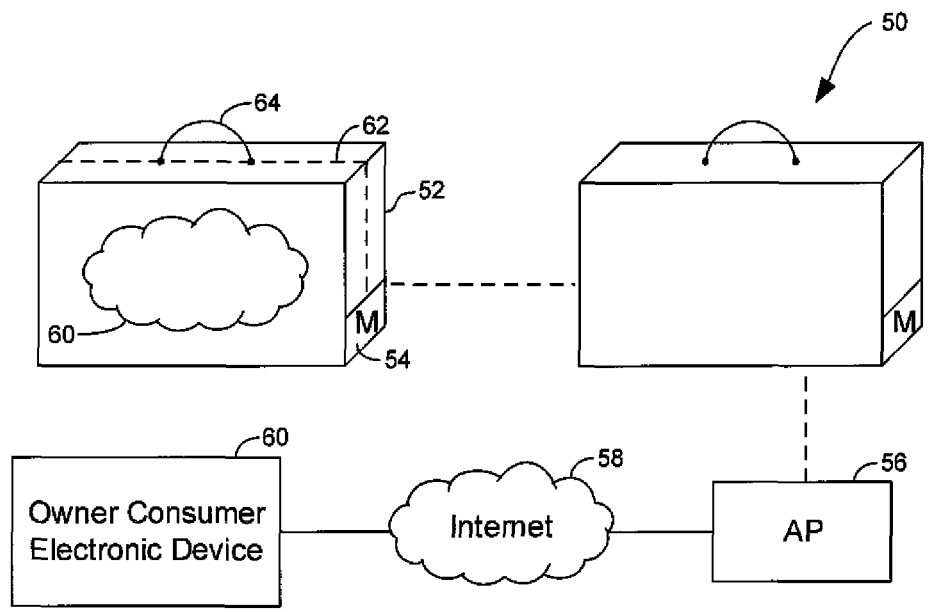
FIG. 3 is a schematic diagram of a specific mesh network implemented by luggage, with portions broken away to show a luggage enclosure.

FIG. 3 shows an example mesh network 50 in which one or more pieces of luggage 52 are associated with respective nodal modules 54 each of which may be implemented by the appropriate components of the example node in FIG. 2. By "luggage" is meant the plain and ordinary meaning of the term, to wit: suitcases, trunks, and other baggage of a traveler.

The modules 54 communicate with each other according to mesh network principles mentioned previously, and when a piece of luggage 52 is sufficiently close to a network access point (AP) 56, mesh network 50 node and link information may be uploaded to a network such as the Internet 58 for provision of the network information to a CE device 60, typically associated with the owner of the luggage 52. The CE device 60 may be implemented by some or all of the components shown in FIG. 2 for a network node.

It is to be understood that each piece of luggage 52 typically defines a respective enclosure 60 that can be opened along, e.g., a border 62 between opposed halves of the luggage 52 to load and unload clothing into the enclosure. The enclosure can then be closed to maintain clothing securely within the enclosure. Without limitation, the luggage 52 may be opened along a hinge, or the border 62 can be parted and joined using a zipper or other connector structure. Multiple opening avenues may be provided into the enclosure 60, and multiple enclosures 60 may be provided in a single piece of luggage 52. Typically, each piece of luggage 52 includes at least one handle 64 attached to the luggage body to facilitate gripping by a human hand.

It is to be understood that the CE device 60 may be registered by an Internet server to be associated with the luggage 52. In an example non-limiting embodiment, the owner of the CE device 60 may co-locate the device 60 and the luggage 52 prior to travel in an initial mesh, with the nodes exchanging information and with the CE device recording the MAC addresses and/or recording or establishing (using user input) component names (e.g., "luggage 1, luggage 2"). The CE device 60 may download a luggage tracking application from the Internet for this purpose, and then upload, using the application, the identity of the luggage associated with the CE device, along with the CE device network address. In this way, an Internet server subsequently receiving information pertaining to the MAC address or other identification of the luggage can download the information to the CE device executing the luggage tracking application.

Figure 4:
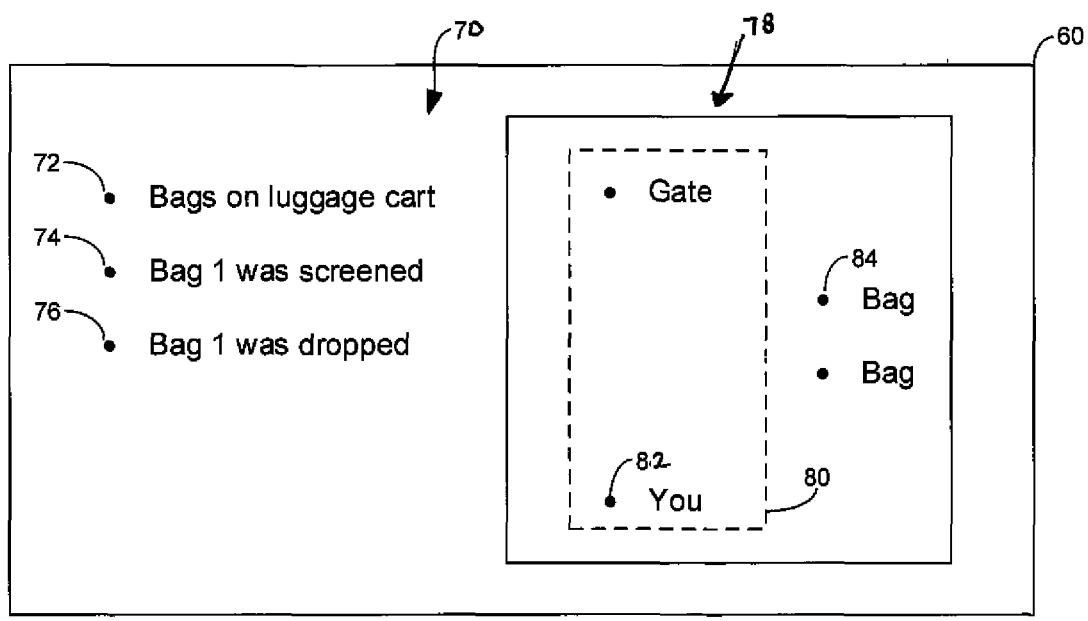
FIG. 4 is a screen shot of an example user interface (UI) that can be presented on a luggage owner's CE device to inform the owner of the location and other parameters of his luggage.

FIG. 4 illustrates an example UI 70 that may be presented on the display of the CE device 60. Based on information from location sensors in the modules 54 that are uploaded from the mesh through the AP 56, one or more messages 72 may be presented regarding the current and in some cases past locations of the luggage. To do this, a cloud server may access a map of the reported luggage locations and correlate the reporting locations to map entries such as luggage carts and luggage screening stations. Accordingly, a first message 72 may indicate a current location of the luggage either by listing GPS positions or, more preferably, by indicating the generic term for the location (e.g., "luggage cart") as shown.

Because each node may record its location periodically, e.g., every minute, and upload a sequence of locations to the cloud, one or more messages 74 may be presented indicating past locations of the luggage. In the example shown, a past location of "bag 1" has been correlated on the map to the location of a screening station, and so the message informs the owner that bag 1 was screened.

Furthermore, the nodal modules 54 may include shock sensors such as accelerometers or gyroscopes or other appropriate sensor, and in this case information from the shock sensors may also be uploaded and correlated to messages 76 indicating that a particular piece of luggage may have been subject to rough handling. In example implementations, either the module 54 processor or a processor in the cloud receiving shock sensor signals from a piece of luggage may determine whether a signal from the shock signal indicates a shock satisfying a threshold. Responsive to a determination that at least one signal from the shock signal indicates a shock satisfying a threshold, the module processor may upload a signal to the network via the transmitter representing shock to the luggage body for reporting thereof to the CE device 60. Alternately, all shock sensor signals may be processed in the cloud and shock reports sent to the CE device 60 only when the shock threshold is triggered. When no signal from the shock signal indicates a shock satisfying a threshold, either no shock signal is uploaded or no shock signal that is uploaded is sent to the CE device, depending on the location of the processor undertaking the determination.

In addition or in lieu of the messages 72-76, a map 78 may be presented on the CE device 60. As shown, the map 78 may indicate the boundary 80 of the passenger terminal in which the CE device 60 is located, indicating at 82 the location of the device within the terminal. The map 78 may also indicate 84 the currently reported locations of the luggage(s) 52 relative to the boundary 80 and/or location 82 of the CE device 60.

Figure 5:
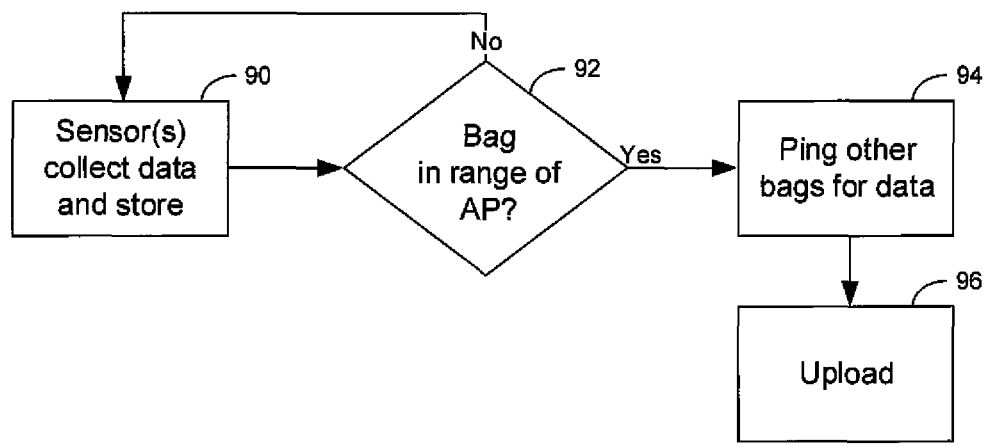
FIG. 5 is a flow chart of example logic.

FIG. 5 illustrates example logic. At block 90 each node module 54 stores signals from its various sensors. When the module processor determines, using information from the module mesh network transmitter, whether communication with the network through an AP is available, the logic moves to block 94 to ping other nodes in the mesh network for their sensor information, if not already obtained by the communicating node, and then at block 96 the node module in communication with the AP automatically sends the location signals (and shock signals if available) to the network.

Figure 6:
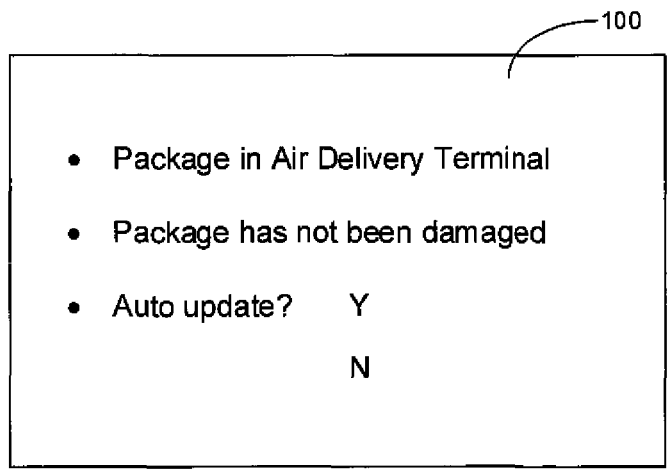
FIG. 6 is a screen shot of another example UI that may be presented on the CE device.

FIG. 6 illustrates that the above principles may also be applied to track packages in real time. A package may be associated with a node module according to principles above to upload information about the package including real time location, possible shock events, etc. to the network so that a UI 100 may be presented on the CE device 60 indicating location and shock events to the recipient. Note the selector shown enabling a user to select whether to have automatic updates of the above information or not.

With various sensors being part of the luggage or package, data can be uploaded whenever the bag is in range of a network. Once uploaded, the data can be retrieved by the owner whenever convenient. The sensors are thus part of a mesh network with other bags so that small or large groups of luggage or packages are tracked by the owner and the shipper (i.e., airlines, train, or cruise boat). As mentioned above, examples of sensor types include: Location via GPS and/or Wi-Fi, RFID, Accelerometer, Gyroscope, Magnetometer, Temperature, Humidity, Pressure, Altitude, and O2 (oxygen).

One example is tracking packages via truck, boat, airplane, or train. Shipping companies can embed the sensor(s) with the tracking label on the package. Every package gets a label, and then the companies wouldn't need to manually track things via barcode scanner. The package just needs to be within range of a network connection (located on vehicles, facilities, etc.).

Preferably, plenty of access points are provided for the sensors to mesh with often enough to provide meaningful updates. While it is sufficient for the customer to track their luggage via a personal database, personal, corporate, and government databases may be shared for all to access. This would help keep redundancy to a minimum, as well as conflicts between databases.

In some implementations, the shock sensor tracks all shock information and uploads all of the shock data regardless of shock magnitude to a server that provides an application to the user's CE device. The user can then employ the CE device to execute the application, access the server, and download the shock data. The application executing on the CE device may present, for example, a UI showing shock signals by magnitude versus time, as but one example, and present a red line passing through a predetermined magnitude to better help the user discern shocks that exceed the predetermined magnitude. The application may also present a warning based on a predetermined number of relatively small threshold shock events exceeding a threshold.

It will be appreciated that while the APPLYING MESH NETWORK TO LUGGAGE has been fully described in relation to one or more example embodiments, these are not intended to be limiting, and that various alternative arrangements may be used to implement the subject matter claimed herein.

What is claimed is:

1. Apparatus comprising:
   at least one computer memory that is not a transitory signal and that comprises instructions executable by at least one processor to:

associate the apparatus with a user's consumer electronics (CE) device in an initial mesh network at least in part by:
  exchanging information with the CE device including sending to the CE device an identifier representing respective luggage defining an enclosure openable to load and unload items into the enclosure and closable to maintain item securely within the enclosure;
  the CE device, executing a luggage tracking application, uploading the identifier along with a network address of the CE device to an Internet server such that when the Internet server subsequently receives information pertaining to the identifier representing the respective luggage can, in response to the information pertaining to the identifier representing the respective luggage, download location information pertaining to the respective luggage to the CE device; and
  upload to a network, via a wireless transmitter, location signals according to signals received from a location sensor of the luggage.

2. The apparatus of claim 1, further comprising:
  at least one shock sensor, the instructions being executable to upload signals to the Internet via the transmitter representing shock to the luggage as indicated by the signals from the shock sensor.

3. The apparatus of claim 2, wherein the shock sensor includes an accelerometer.

4. The apparatus of claim 2, wherein the shock sensor includes a gyroscope.

5. The apparatus of claim 1, wherein the apparatus is a first apparatus associated with first luggage in a mesh network including at least a second luggage, and the instructions are executable to:
  determine, using information from the transmitter, whether communication with the Internet through at least one network access point (AP) is available; and
  responsive to a determination that communication with the Internet through at least one AP is available, automatically send to the Internet first location information pertaining to the first luggage and second location information pertaining to the second luggage and received through the mesh network.

6. The apparatus of claim 5, wherein the instructions are executable to, responsive to a determination that communication with the network through at least one network access point is available, automatically send a sequence of locations signals to the network.

7. The apparatus of claim 2, wherein the instructions when executed by the processor configure the processor to:
  determine whether a signal from the shock signal indicates a shock satisfying a threshold;
  responsive to a determination that at least one signal from the shock signal indicates a shock satisfying a threshold, upload at least one signal to the network via the transmitter representing shock to the luggage body; and
  responsive to a determination that no signal from the shock signal indicates a shock satisfying a threshold, not upload a signal to the network via the transmitter representing shock to the luggage body.

8. Mesh network, comprising:
  plural computerized node modules associated with respective pieces of luggage and dynamically forming a mesh network which uploads location information of the node modules to a receiving network for downloading of the location information to a consumer electronics (CE) device, wherein at least first and second node modules in the plural computerized node modules include at least respective first and second computer memories that are not transitory signals, at least the first computer memory comprising instructions executable by at least one processor to:
  receive from at least the second node module second location information associated with a location of the respective piece of luggage associated with the second node module; and
  responsive to a determination that communication with a wide area network (WAN) through an access point (AP) is available, automatically send at least the second location information through the AP to the WAN.

9. The mesh network of claim 8, wherein the instructions are executable to:
  responsive to a determination that communication with a wide area network (WAN) through an access point (AP) is available, query at least the second node module for the second location information.

10. The mesh network of claim 8, wherein each node module includes:
  at least one location sensor engaged with the respective piece of luggage;
  at least one wireless transmitter supported by the respective piece of luggage;
  at least one processor, the instructions being executable to:
  upload to the WAN, via the wireless transmitter, location signals according to signals received from the location sensor.

11. The mesh network of claim 10, wherein at least one node module further comprises:
  at least one shock sensor supported by the respective piece of luggage and configured to send signals to the respective processor, the respective instructions being executable to upload signals to the WAN via the respective transmitter representing shock to the respective piece of luggage as indicated by the signals from the respective shock sensor.

12. The mesh network of claim 8, wherein first and second instructions are accessible through the first and second memories and each of the first and second instructions is executable for:
  associating the respective node module with a user's consumer electronics (CE) device in an initial mesh at least in part by:
  exchanging information with the CE device including sending to the CE device an identifier representing the respective luggage;
  the CE device, executing a luggage tracking application, uploading the identifier along with a network address of the CE device to an Internet server such that when the Internet server subsequently receives information pertaining to the identifier representing the respective luggage can, in response to the information pertaining to the identifier representing the respective luggage, download location information pertaining to the respective luggage to the CE device.

13. The mesh network of claim 11, wherein the instructions are executable to:
  determine whether a signal from the shock signal indicates a shock satisfying a threshold;
  responsive to a determination that at least one signal from the shock signal indicates a shock satisfying a threshold, upload at least one signal to the WAN via the transmitter representing shock to the respective piece of luggage; and
  responsive to a determination that no signal from the shock signal indicates a shock satisfying a threshold, not upload a signal to the WAN via the transmitter representing shock to the respective piece of luggage.

\* \* \* \* \*